United States Patent Office 3,634,274
Patented Jan. 11, 1972

3,634,274
**TETRACHLORODIFLUOROETHANE-NITRO-
METHANE SOLVENT COMPOSITION**
Oliver A. Barton, Florham Park, N.J., and Kevin P. Murphy, Orchard Park, N.Y., assignors to Allied Chemical Corporation, New York, N.Y.
No Drawing. Filed June 5, 1970, Ser. No. 43,960
Int. Cl. C09d 9/00; C11d 7/50; C23g 5/02
U.S. Cl. 252—171      4 Claims

ABSTRACT OF THE DISCLOSURE

Tetrachlorodifluoroethanes (sym-, unsym-, and mixtures thereof) and nitromethane, in certain proportions, form azeotropic mixtures which are constant boiling and which possesses solvent characteristics for certain organic polymers substantially greater than either the tetrachlorodifluoroethanes or nitromethane alone. These mixtures are useful as solvent media for coating and adhesive compositions and as stripping agents to remove films bonded on organic polymers.

BACKGROUND OF THE INVENTION

The application of organic film forming resins to various substrata is an important facet of the organic polymer industry. By far, the major proportions of the coating compositions prepared currently comprise a film forming resin dissolved or dispersed in an organic solvent. Upon evaporation of the solvent the film former, which may be of the reactive or reacted type, forms a coherent coating on the substrate and thus serves to protect or enhance the appearance thereof.

Similarly, many adhesive compositions comprise essentially an organic resin dissolved or dispersed in an organic solvent medium.

It is of prime importance that such compositions wet the surface of the substrate so that, upon evaporation of the solvent, no pin holes or voids appear in the residual polymer mass which, in the case of coatings, would fail to protect the substrate from corrosion and, in the case of adhesives, would seriously detract from the total bond strength of the adhesive joint.

The solvents used in such compositions are commonly selected from aromatic solvents such as toluene and xylene, esters, such as butyl acetate and amyl propionate, alcohols, such as isopropanol and butanol, and ketones, such as acetone and methyl ethyl ketone.

Such commonly used solvents have the desirable properties of cheapness, effectiveness and ready availability. However, such solvents and mixtures thereof exhibit one or more of the following undesirable properties: flammability, toxicity, high boiling point and sensitivity to moisture.

It is known that some polyhalogenated lower alkanes such as trichlorofluoromethane, trichlorotrifluoroethane and trichlorodifluoroethane possess solvent characteristics of a high order. Such compounds are notably of low toxicity to warm blooded animals and are non-flammable. Tetrachlorodifluoroethane, i.e. the commercially available mixture of the symmetrical and unsymmetrical isomers, which is of low toxicity and is non-flammable, has the disadvantage of freezing at 26° C. and, in addition, is a relatively poor solvent for many organic polymers.

It is known in this art to utilize mixtures containing halocarbon compounds to achieve a compromise of properties of the halocarbon components. Such mixtures may contain two or more halocarbons or at least one halocarbon together with another organic compound, such as an alcohol or an ether. Moreover, in the usual instance, such mixtures can fractionate during the reclamation of the solvents by distillation (thereby giving different mixtures having different solvent characteristics), thus making the handling and recovery of such solvent mixtures difficult and expensive.

More recently, a number of mixtures containing a halocarbon component, which are azeotropic in nature, have been discovered. Such mixtures, in which the composition of the vapor phase is the same as that of the liquid phase with which it is in equilibrium, are not subject to fractionation during reclamation, as is the case with non-azeotropic mixtures.

This and other advantages of azeotropic mixtures over non-azeotropic mixtures are well known to those skilled in this art. Unfortunately, as evidenced by the disclosure in U.S. Pat. 3,085,065 to Kvalnes, a basis has not been found for predicting the formation of azeotropes between or among halocarbons, much less mixtures of halocarbons and other organic compounds.

SUMMARY OF THE INVENTION

In accordance with the present invention, we have made the surprising discovery that tetrachlorodifluoroethane ($C_2Cl_4F_2$), B.P. 92.5° C. and nitromethane ($CH_3NO_2$), B.P. 101.2° C., in certain proportions, forms an azeotropic mixture which mixture boils at a temperature below that of the lower boiling $C_2Cl_4F_2$ component and which mixtures possess enhanced solvency for certain organic polymers, notably polystyrene, compared to nitromethane or the halocarbon alone.

The azeotrope of our invention consists of about 85 weight percent $C_2Cl_4F_2$ and 15 weight percent $CH_3NO_2$ at atmospheric pressure and has a normal boiling point of about 81° C.

The azeotropic mixture of our invention exhibits a number of desirable properties for solvent purposes such as a higher degree of solvent power for typical organic polymers than either of the components, non-flammability, low toxicity and others.

A highly unexpected property of the azeotropic mixture of our invention resides in the synergistic improvement of the solubility of certain organic polymers, notably polystyrene, in the mixture. This property is particularly significant to the art in view of the excellent wetting, non-flammability and low toxicity of the said mixture. These characteristics combine to make the new azeotropic mixture a highly efficient solvent for coating and adhesive compositions, which currently are formulated using organic solvents which are flammable and toxic.

It is known, see U.S. Pat. 3,085,116 to Kvalnes, to prepare mixtures of various chlorofluoroalkanes, including tetrachlorodifluoroethane, with from 0.1% to 5% by weight of mononitro alkane of from 1 to 3 carbon atoms, including nitromethane, which mixtures are resistant to the reaction which normally occurs between the said halocarbons and primary and secondary alcohols. Such mixtures of the halocarbon, particularly tetrachlorodifluoroethane and up to 5% by weight of nitromethane are not constant boiling, i.e., they will fractionate on distillation, thereby making their recovery intact impossible. Moreover, the enhanced solvent characteristics of such mixture is not disclosed or suggested in this prior art disclosure.

The azeotropic mixture of our invention is substantially constant boiling, possesses a boiling point lower than either of the components thereof, i.e., such mixture possesses a minimum boiling point, and consists essentially of about 85% by weight of tetrachloridifluoroethane and about 15% by weight of nitromethane. The true azeotropic mixture has a boiling point of 81.45° C. at 760 mm. pressure and consists of 85% by weight of tetrachlorodifluoroethane and 15% by weight of nitromethane. As will be apparent to one of ordinary skill in this art, mixtures other than the true azeotropic mixture may be employed which are substantially equivalent to the true azeotropic mixture in terms of solvency power and/or essentially constant boiling characteristics.

The azeotropic mixture of our invention may be employed as a solvent for organic polymers, particularly polystyrene, either in the preparation of coating or adhesive compositions containing such polymers as film formers or adhesives, or in the formulation of stripping agents for the removal of such polymeric coatings or adhesives.

Additionally, the azeotropic mixture of our invention is useful as a blowing agent in the preparation of polymeric foams, as a precision cleaning solvent, as a heat transfer medium and as a working fluid in vapor cycle engines.

The halocarbon component of the azeotropic mixture of this invention is available commercially as a mixture of about 69 mol percent of the symmetrical isomer 1,1,3,3-tetrachloro-1,2-difluoroethane and about 31 mol percent of the unsymmetrical isomer 1,1,1,2-tetrachloro-2,2-difluoroethane. We have found that either isomer, per se, or the commercially available mixtures thereof when admixed with nitromethane, yield azeotropic mixtures of substantially identical characteristics and properties.

Accordingly, all references contained in this specification to tetrachlorodifluoroethane apply to mixtures of the said two isomers, in any proportions, or to either isomer per se.

The following examples will illustrate the present invention.

EXAMPLE 1

(A) Equimolecular quantities of tetrachlorodifluoroethane (a mixture of 69 mol percent of $CFCl_2CFCl_2$ and 31 mol percent of $CF_2ClCCl_3$, a commercially available mixture) and nitromethane were heated to reflux in a laboratory fractional distillation apparatus. After equilibrium was established, the head temperature was about 81° C. A portion of the mixture was distilled at this temperature and was found to contain both components of the original mixture.

The fraction distilling at 81.45° C./760 mm. was redistilled. The temperature at which this mixture distilled was constant during the entire redistillation. The distillate was analyzed by gas chromatography and found to contain 85 weight percent $C_2Cl_4F_2$ and 15 weight percent $CH_3NO_2$.

(B) The procedure of part (A) above was repeated using the substantially pure isomers, $CCl_2FCCl_2F$ and $CCl_3CF_2Cl$ in place of the commercially available mixture thereof. Azeotropic mixtures of each of the pure isomers with nitromethane were obtained, each azeotrope having essentially the same boiling point. Table I below lists the boiling points of the azeotropic mixtures obtained.

TABLE I

Boiling points of binary azeotropes with nitromethane

| Halocarbon component: | Boiling point, ° C./760 mm. |
|---|---|
| $CF_2ClCCl_3$ | 81.2 |
| $CFCl_2CFCl_2$ | 81.4 |

(C) A sample of the azeotropic mixture of part (A) above was tested for flammability of the Tag Open Cup Flash Point Test of Volatile Flammable Material (ASTM–D1310–63) and was found to be non-flammable.

EXAMPLE 2

Tetrachlorodifluoroethane, nitromethane and the azeotropic mixture consisting of 85 weight percent $C_2Cl_4F_2$ and 15 weight percent $CH_3NO_2$ obtained in Example 1 part (A) above were saturated at room temperature with polystyrene. The amount of dissolved organic polymer was determined in each instance by evaporating an aliquot of each saturated solution. The results expressed in terms of grams of polystyrene dissolved in 100 grams of the indicated solvent follow.

| Solvent: | Grams/100 grams solvent |
|---|---|
| $C_2Cl_4F_2$ | 6.0 |
| $CH_3NO_2$ | 1.0 |
| Azeotropic mixture | 38.0 |

The above data demonstrate the unusually high solvency power of the true azeotropic mixture, as compared with the individual components.

We claim:
1. Constant boiling mixtures consisting essentially of about 85% by weight tetrachlorodifluoroethane and about 15% by weight of nitromethane.
2. Mixtures according to claim 1 in which the tetrachlorodifluoroethane is substantially pure 1,1,2,2-tetrachloro-1,2-difluoroethane.
3. Mixtures according to claim 1 in which the tetrachlorodifluoroethane is substantially pure 1,1,1,2-tetrachloro-2,2-difluoroethane.
4. A mixture according to claim 1 in which the composition consists of 85% by weight of tetrachlorodifluoroethane and 15% by weight of nitromethane and boils at 81.45° C. at 760 mm. pressure.

References Cited
UNITED STATES PATENTS

| 3,085,116 | 4/1963 | Kvalnes | 260—652.5 |
| 3,445,527 | 5/1969 | Obamara | 260—652.5 |

LEON D. ROSDOL, Primary Examiner

W. E. SCHULZ, Assistant Examiner

U.S. Cl. X.R.

106—311; 252—DIG. 9; 260—652.5